United States Patent [19]
DuBell et al.

[11] Patent Number: 5,078,324
[45] Date of Patent: Jan. 7, 1992

[54] PRESSURIZED STEM AIR BLAST FUEL NOZZLE

[75] Inventors: Thomas L. DuBell, Palm Beach Gardens, Fla.; Curt Scheuerman, Newberry, Ohio

[73] Assignee: United Technologies Corporation, Hartford, Conn.

[21] Appl. No.: 598,463

[22] Filed: Oct. 11, 1990

[51] Int. Cl.$^5$ .......................... B05B 7/10; B05B 7/06
[52] U.S. Cl. .................................... 239/407; 239/419; 239/424
[58] Field of Search ............... 239/407, 408, 410, 419, 239/424; 60/740-742

[56] References Cited

U.S. PATENT DOCUMENTS 3,443,760  5/1969  Simmons .......................... 239/410
4,754,922  7/1988  Halversen et al. ................. 239/410

Primary Examiner—Andres Kashnikow
Assistant Examiner—Lesley D. Morris

[57] ABSTRACT

An air blast fuel nozzle for a gas turbine engine having a variable valve for controlling the flow of fuel to the combustor of the engine and valve bypass means for the flow of a low quantity of fuel to said combustor without passing through said variable valve to provide transient operability during stall recovery and spool down starting.

1 Claim, 2 Drawing Sheets

PRESSURIZED STEM AIR BLAST FUEL NOZZLE

This invention was made with Government support under a contract awarded by the Air Force. The Government has certain rights in this invention.

DESCRIPTION

1. Technical Field

This invention relates to gas turbine engines and particularly to the fuel nozzle for the main burner and the construction thereof.

2. Background Art

Gas turbine engines used to power fighter-type aircraft must tolerate extreme maneuvers without failing to deliver reliable power. Sometimes these maneuvers result in compressor stall which leads to combustor blow out. If the combustor blow out is prevented, then it is possible for the engine to recover power without pilot action. Also, sometimes blow out or engine shut down in flight occurs and it is desirable to quickly restart the engine. Restarts of this nature are called spool down air starts.

Stall recovery and spool down starting are an engine "operability" challenge for a combustion system. Many modern engines use fuel injectors referred to as air blast fuel nozzles. A nozzle of this type is disclosed in commonly-owned U.S. Pat. No. 4,773,596 issued Sept. 27, 1988. Such nozzles provide superior "steady state" performance and reliability relative to older technology fuel pressure atomizing nozzles. They are less complex and are more tolerant to fuel contamination. Another major advantage is that higher fuel inlet temperatures and engine cycle temperatures are possible without causing fuel delivery passage blockage from internal coke generation. However, air blast nozzles have transient operability difficulty with stall recovery and spool down starting.

DISCLOSURE OF INVENTION

An object of the invention is to provide a gas turbine engine fuel nozzle that has the performance advantages of an air blast nozzle and the operability advantages of a pressure atomizing fuel nozzle.

Another object of the invention is to provide an air blast fuel nozzle which increases fuel/air ratio during the transient of a power loss due to stall or flight shut down by preventing a significant quantity of the fuel from vaporizing during the transient.

The foregoing and other objects, features and advantages will be apparent from the following specification and claims and from the accompanying drawings which illustrate an embodiment of the invention.

BEST MODE FOR CARRYING OUT THE INVENTION

Figure 1:
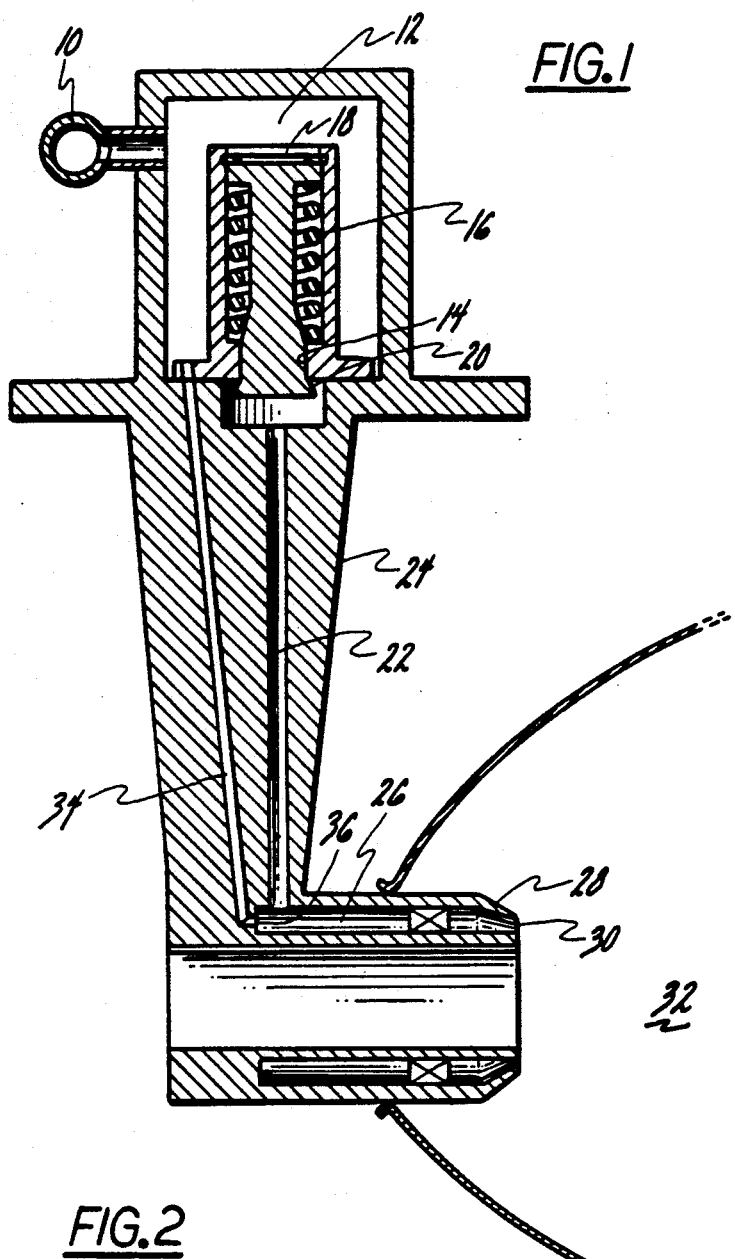
FIG. 1 is a schematic sectional view of a fuel nozzle in accordance with the invention.

In the fuel nozzle shown in FIG. 1, fuel at high pressure is delivered to the nozzle from manifold 10. Fuel enters housing cavity 12 containing variable valve 14 which is loaded by spring 16. The pressure of fuel acting on valve spool 18 will cause the valve spool to move downward and fuel will pass through metering orifice 20 into passage 22 in nozzle stem 24. The flow-through area increases as the pressure drop from cavity 12 to passage 22 increases. Fuel in passage 22 is delivered to annular chamber 26 in circular nozzle tip 28 and from here the fuel exits through nozzle tip annulus 30 into combustor 32.

In accordance with the invention, passage 34 is incorporated, connecting housing cavity 12 and annular chamber 26 and bypassing valve 14. Small orifice 36 is located where passage 34 enters annular chamber 26 and serves to create a high pressure drop so that pressure in passage 34 is always above that at which fuel vaporization will occur. During compressor stall recovery and spool down starting events, fuel flows are low so that a significant portion of the fuel delivered to cavity 12 from manifold 20 is delivered to combustor 32 from nozzle tip 28 through passage 34. Thus, liquid fuel is delivered to the nozzle tip to reduce the vaporization induced drop in fuel/air ratio in the combustor during the transient resulting from power loss, and lean blow out does not occur.

As the fuel rate increases, valve 14 will open and fuel will be delivered to nozzle tip 28 through passage 22, in addition to that being delivered to the nozzle tip through passage 34.

Figure 2:
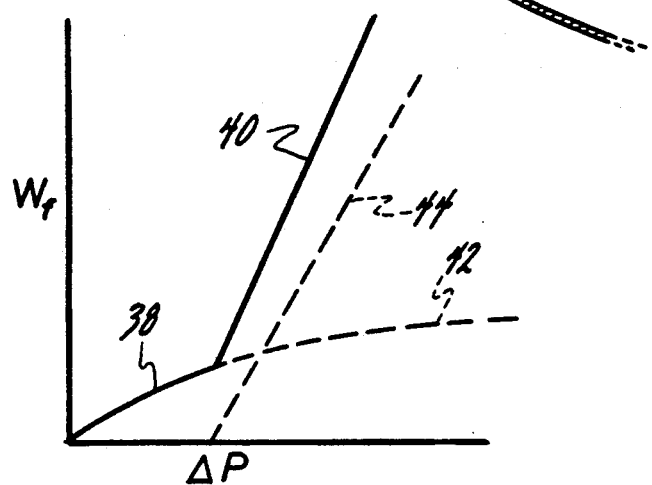
FIG. 2 is a plot of fuel flow in the nozzle of FIG. 1.

The curve of FIG. 2 shows fuel flow versus the pressure drop between cavity 12 and annular chamber 26. Full curved line 38 represents the initial flow to combustor 32 through passage 34 and orifice 36 prior to the opening of valve 14. Full straight line 40 is the total fuel flow to the combustor as valve 14 opens with increasing pressure drop. Total fuel flow, as represented by line 40, is made up by the flows indicated by broken lines 42 and 44, broken line 42 being low flow through passage 34 bypassing valve 14 and broken line 44 being flow through the valve.

Figure 3:
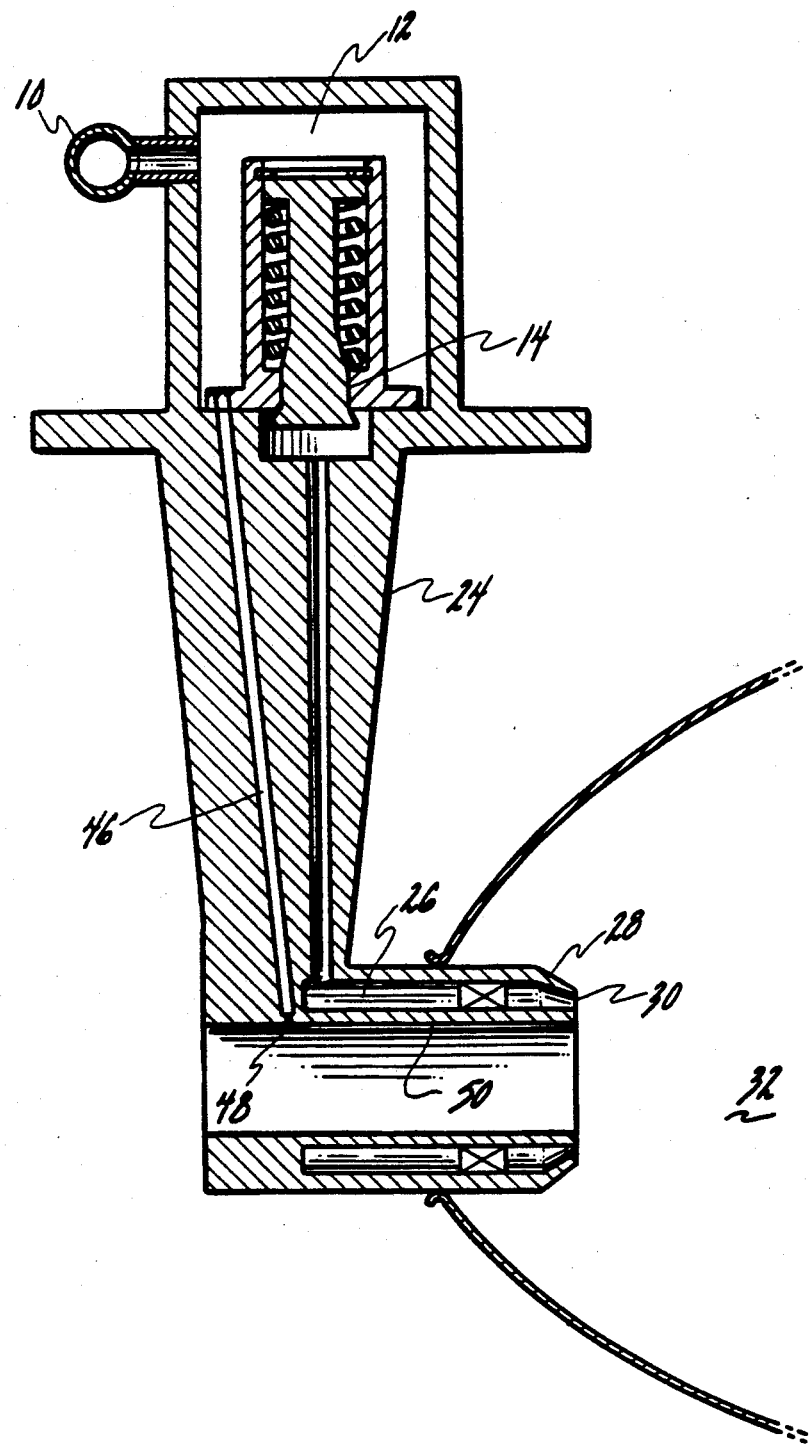
FIG. 3 is a modification of the fuel nozzle shown in FIG. 1.

In the modification of the fuel nozzle shown in FIG. 3, bypass passage 46 in nozzle stem 24 delivers fuel through orifice 48 into airflow passage 50 within nozzle tip 28. Thus, fuel reaches combustor 32 directly rather than passing through annular chamber 26 and nozzle tip annulus 30 as in the modification of FIG. 1.

The nozzle of this invention as illustrated by FIGS. 1 and 3 has transient operability advantages. It also is more tolerant to fuel contamination and to internally generated coking. This is due to the location of orifice 36, or orifice 48, in a well insulated part of the fuel nozzle and also to the fact that any partial plugging on the orifice will have little impact on engine performance.

It should be understood that the invention is not limited to the particular embodiments shown and described herein, but that various changes and modifications may be made without departing from the spirit or scope of this concept as defined by the following claims.

We claim:

1. A fuel nozzle for a gas turbine powerplant, said nozzle including a generally circular nozzle tip having an annular fuel chamber, an annulus for the discharge of fuel and a central air passage, means for supplying fuel to said nozzle, spring loaded valve means interposed between said fuel supply means and said nozzle tip annular fuel chamber, first passage means for conducting fuel from said valve means to said nozzle tip annular fuel chamber, and second passage means for conducting fuel from said fuel supply means to said nozzle tip central air passage directly without passing through said valve means, and orifice means interposed in said second passage means at the inlet to said nozzle tip central air passage.

* * * * *